(12) United States Patent
Watanabe

(10) Patent No.: US 8,164,685 B2
(45) Date of Patent: Apr. 24, 2012

(54) IMAGE PICKUP APPARATUS WHICH PERFORMS APERTURE VALUE CONTROL FOR A MULTIPLE EXPOSURE IMAGE, AND RECORDING MEDIUM

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 420 days.

(21) Appl. No.: 12/391,409

(22) Filed: Feb. 24, 2009

(65) Prior Publication Data

US 2009/0213235 A1 Aug. 27, 2009

(30) Foreign Application Priority Data

Feb. 26, 2008 (JP) ................. 2008-044805

(51) Int. Cl.
*H04N 5/238* (2006.01)
*H04N 5/228* (2006.01)
(52) U.S. Cl. .................................... 348/363; 348/208.1
(58) Field of Classification Search ............. 348/208.99, 348/208.1–208.4, 362, 363
See application file for complete search history.

(56) References Cited

U.S. PATENT DOCUMENTS

| | | | |
|---|---|---|---|
| 7,301,563 B1 * | 11/2007 | Kakinuma et al. | 348/208.13 |
| 7,620,314 B2 | 11/2009 | Hamamura | |
| 7,925,053 B2 | 4/2011 | Altherr | |
| 7,995,852 B2 | 8/2011 | Nakamaru | |
| 2004/0130638 A1 * | 7/2004 | Sakamoto | 348/254 |
| 2007/0268397 A1 * | 11/2007 | Udono | 348/362 |

FOREIGN PATENT DOCUMENTS

| | | | |
|---|---|---|---|
| JP | 6-160933 | A | 6/1994 |
| JP | 08-163573 | A | 6/1996 |
| JP | 08-251474 | A | 9/1996 |
| JP | 3164121 | B2 | 3/2001 |
| JP | 2002-64736 | A | 2/2002 |
| JP | 2002-84444 | A | 3/2002 |
| JP | 2002-84453 | A | 3/2002 |
| JP | 2003-125289 | A | 4/2003 |
| JP | 2006-157428 | A | 6/2006 |
| JP | 2007-074031 | A | 3/2007 |
| JP | 2007-180631 | A | 7/2007 |
| JP | 2007-267378 | A | 10/2007 |
| JP | 2007-336235 | A | 12/2007 |

OTHER PUBLICATIONS

Japanese Office Action dated Feb. 7, 2012 (and English translation thereof) in counterpart Japanese Application No. 2008-044805.

* cited by examiner

*Primary Examiner* — Kelly L Jerabek
(74) *Attorney, Agent, or Firm* — Holtz, Holtz, Goodman & Chick, PC

(57) ABSTRACT

An image pickup apparatus according to the present invention comprises an image pickup unit for obtaining an image, the image pickup unit including an image pickup element and an image pickup optical system which includes an aperture stop and forms the image on the image pickup element, a synthesis instruction unit for providing an instruction to form a multiple exposure image by making registration of a plurality of images and synthesizing the plurality of images into one image, an aperture value control unit for controlling setting of an aperture value of an aperture stop when the synthesis instruction unit provides the instruction to form the multiple exposure image, and an image processing unit for forming the multiple exposure image by synthesizing, into one image, a plurality of images obtained by the image pickup unit with the aperture value set by the aperture value control unit.

8 Claims, 9 Drawing Sheets

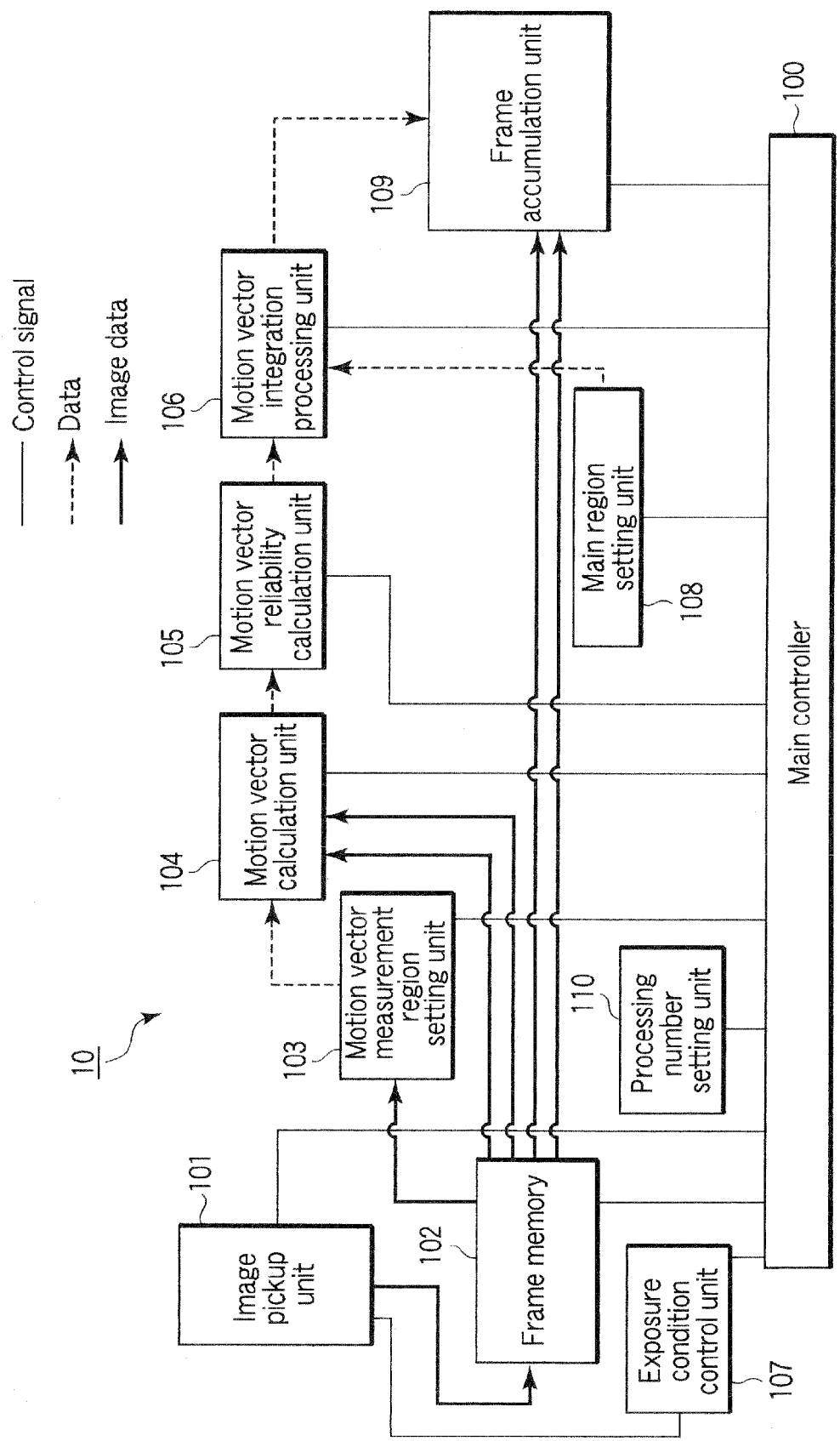
F I G. 1

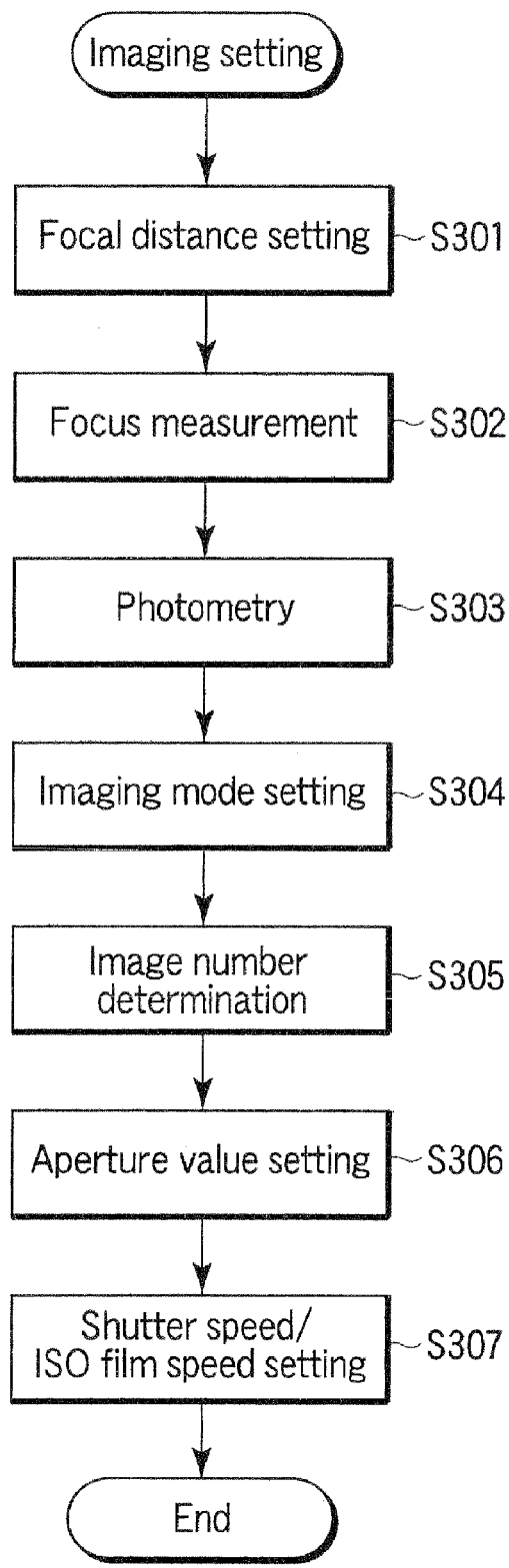
F I G. 3

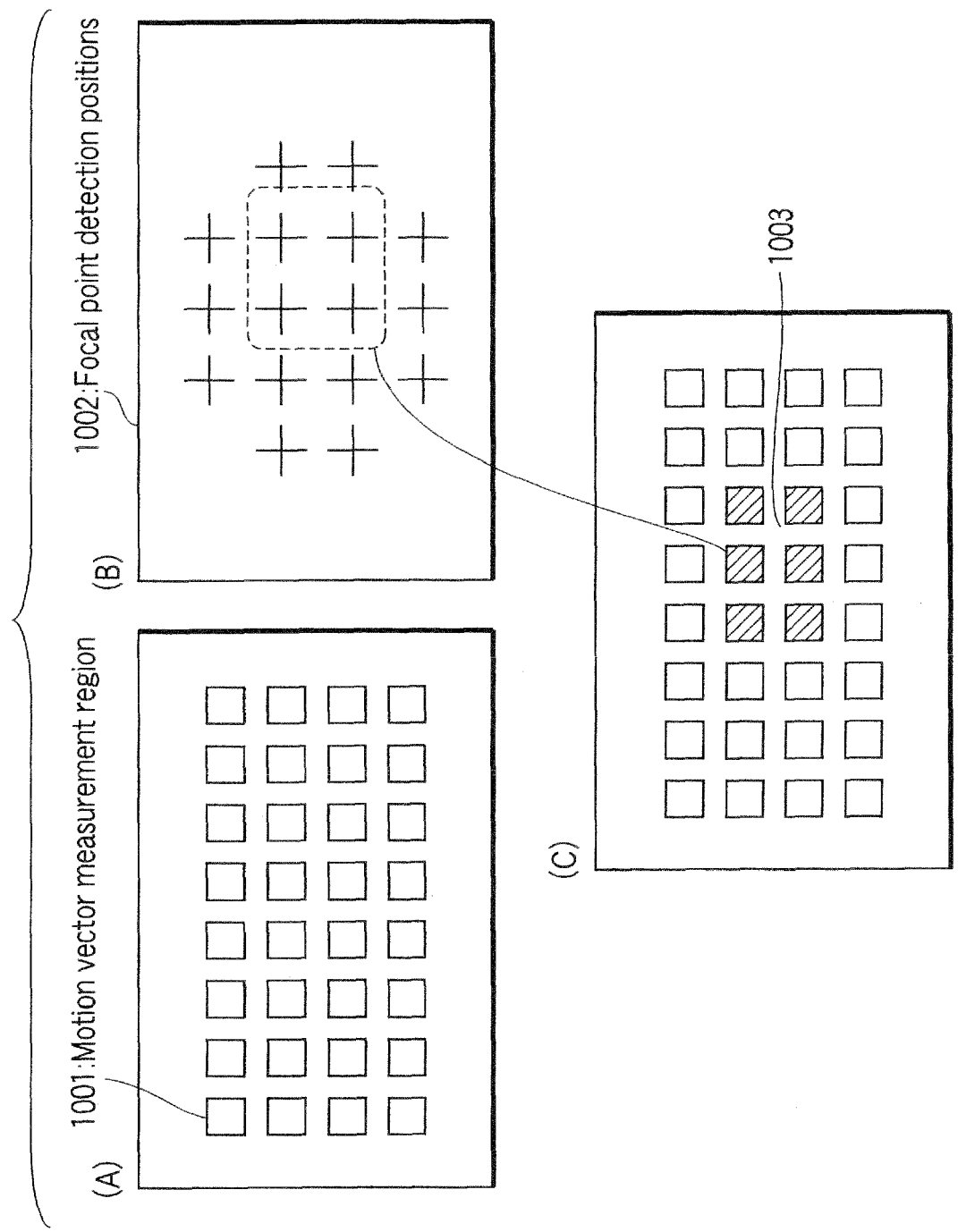
F I G. 10

IMAGE PICKUP APPARATUS WHICH PERFORMS APERTURE VALUE CONTROL FOR A MULTIPLE EXPOSURE IMAGE, AND RECORDING MEDIUM

BACKGROUND OF THE INVENTION

1. Field of the Invention

The present invention relates to an image pickup apparatus and recording medium suitable for a digital camera or the like having a multiple exposure function.

2. Description of the Related Art

As a camera shake reduction technology suitable for an electronic still camera, a multiple exposure technology for obtaining an image free from a camera shake by performing continuous imaging of a plurality of images at a high shutter speed which does not cause a camera shake, and synthesizing the plurality of images while making registration thereof in a step after imaging has been considered.

To superimpose a plurality of images, motion vectors between the plurality of images are detected by use of information on the plurality of images at a pixel level, and positional displacements between a plurality of frames are corrected based on the detected motion vectors.

As means for detecting the motion vectors of the images, a block matching method and a correlation method based on a correlation operation have been conventionally known.

The block matching method is a method of dividing an input image signal into a plurality of blocks in a right size (for example, 8 by 8 matrix of pixels), calculating differences between each block, i.e., pixels in a fixed range, and the corresponding block in a previous field or a previous frame, and searching for a block in the previous field or the previous frame, in which the sum of the absolute values of the differences is minimum. The relative displacement between images, i.e., positional correlation between images, is indicated by a motion vector of the block.

In block matching, a block of high correlation is searched for by evaluation based on a squared difference SSD and an absolute value of a difference SAD. In a reference block region I and a target block region I' on which matching is performed, supposing that pixel positions are $p \in I$ and $q \in I'$ (p and q each represents a two-dimensional quantity, I and I' each represents a two-dimensional region, and $p \in I$ means that coordinate p is included in region I), and pixel levels are Lp and Lq, the squared difference SSD and the absolute value of the difference SAD are defined as $$SSD(I, I') = \sum_{p \in I, q \in I'} (Lp - Lq)^2 \quad (1)$$

$$SAD(I, I') = \sum_{p \in I, q \in I'} \|Lp - Lq\| \quad (2)$$

When the squared difference SSD and the absolute value of the difference SAD are both small, correlation is evaluated as high.

In the correlation method based on a cross-correlation operation, Ave (Lp) and Ave (Lq), which are a mean value of pixels $p \in I$ included in matching reference block region I and a mean value of pixels $q \in I'$ included in matching target block region I', are calculated, and a difference between each mean value and a pixel value included in each block $$Lp' = \frac{LP - Ave(Lp)}{\sqrt{\frac{1}{n}\sum_{p \in I}(Lp - Ave(Lp))^2}}\Bigg|_{p \in I}, \quad (3)$$

$$Lq' = \frac{Lq - Ave(Lq)}{\sqrt{\frac{1}{n}\sum_{p \in I}(Lq - Ave(qL))^2}}\Bigg|_{p \in I'}$$

is calculated to obtain $$NCC = \sum Lp' Lq' \quad (4)$$

thereby evaluating a block whose NCC is large as a block of high correlation, and determining the displacement between block I and block I' of the highest correlation as a motion vector.

When a picked-up subject, i.e., a subject included in an image, is stationary, the motion in each region is consistent with the motion of the entire image, and the correlation operation is performed on a block in an arbitrary fixed position, and a motion vector of the block is calculated.

There are some cases in which a motion vector with high reliability cannot be obtained due to noise or a condition in which a block is on a flat part or on an edge part of a structure that is larger than the block. To preclude such cases, Jpn. Pat. Appln. KOKAI Publication No. 8-163573 (Patent Document 1) and Japanese Patent No. 3164121 (Patent Document 2) suggest a technology for performing reliability determination when calculating a motion vector.

When a picked-up subject, i.e., a subject included in an image, includes a plurality of motions, it becomes necessary to calculate a motion vector of the entire image for the purpose of blur correction, for example. To achieve this object, Jpn. Pat. Appln. KOKAI Publication No. 8-251474 (Patent Document 3) suggests a technology for dividing a subject into a plurality of regions, selecting a main region from the plurality of regions by use of a region selection means based, for example, on the magnitude of the motion vector and the magnitude of the region, and determining the motion of the main region as the motion of the entire image.

Patent Document 3 discloses the following configurations:

The region selection means selects a region covering the largest area from the plurality of regions.

The region selection means selects a region of the smallest motion vector from the plurality of regions.

The region selection means selects a region having the largest area overlapping the region previously selected from the plurality of regions.

The region selection means selects one of the region covering the largest area, the region of the smallest motion vector, and the region having the largest area overlapping the region previously selected.

Image processing technology related to a main region and a background, which is a region other than the main region, is disclosed in Jpn. Pat. Appln. KOKAI Publication No. 2003-125289 (Patent Document 4) and Jpn. Pat. Appln. KOKAI Publication No. 2007-074031 (Patent Document 5).

Patent Document 4 discloses technology for performing softening processing on a background when synthesizing a main region and a background. Patent Document 5 discloses technology for performing panning filter processing on separated backgrounds and then performing synthesis processing so as to produce a panning effect.

When blur correction is performed placing importance on correction of the motion in the main region as described in Patent Document 3, there arises a problem that, in image processing for superimposing a plurality of images, displacements of images of a subject (image overlapping) are conspicuous in the background part which shows a motion different from the motion of the main region.

When blur correction is performed placing importance on the main region, images may be picked up under a condition that reduces the image overlapping. However, complicated setting by a user needs to be simplified.

Further, as shown in Patent Document 5, image processing on an image-overlapping portion may be performed by making region segmentation, calculating a motion vector of each region, performing registration placing importance on a main region, and performing filter processing on a region other than the main region.

However, to perform image processing to the extent that the image is not unnatural at the boundary between the main region and a region other than the main region, a region must be divided into blocks of a small pixel unit, therefore image processing needs to be improved. Consequently, the calculation becomes large.

In view of above-described situations, the present invention has been made for the purpose of providing an image pickup apparatus and recording medium capable of easily forming a multiple exposure image in which image overlapping is inconspicuous in an unfocused image region.

BRIEF SUMMARY OF THE INVENTION

According to one embodiment of the present invention, an image pickup apparatus comprises: an image pickup unit for obtaining an image, the image pickup unit including an image pickup element and an image pickup optical system which includes an aperture stop and forms the image on the image pickup element, a synthesis instruction unit for providing an instruction to form a multiple exposure image by making registration of a plurality of images and synthesizing the plurality of images into one image; an aperture value control unit for controlling setting of an aperture value of an aperture stop when the synthesis instruction unit provides the instruction to form the multiple exposure image; and an image processing unit for forming the multiple exposure image by synthesizing, into one image, a plurality of images obtained by the image pickup unit with the aperture value set by the aperture value control unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a circuit configuration of an image pickup apparatus according to one embodiment of the present invention.

FIG. 3 is a flowchart showing processing for setting an imaging condition according to the same embodiment.

FIG. 10 is a drawing exemplifying a motion vector measurement region, positions at which a focal point is detected, and a focused region in an image according to the same embodiment.

DETAILED DESCRIPTION OF THE INVENTION

Figure 2:
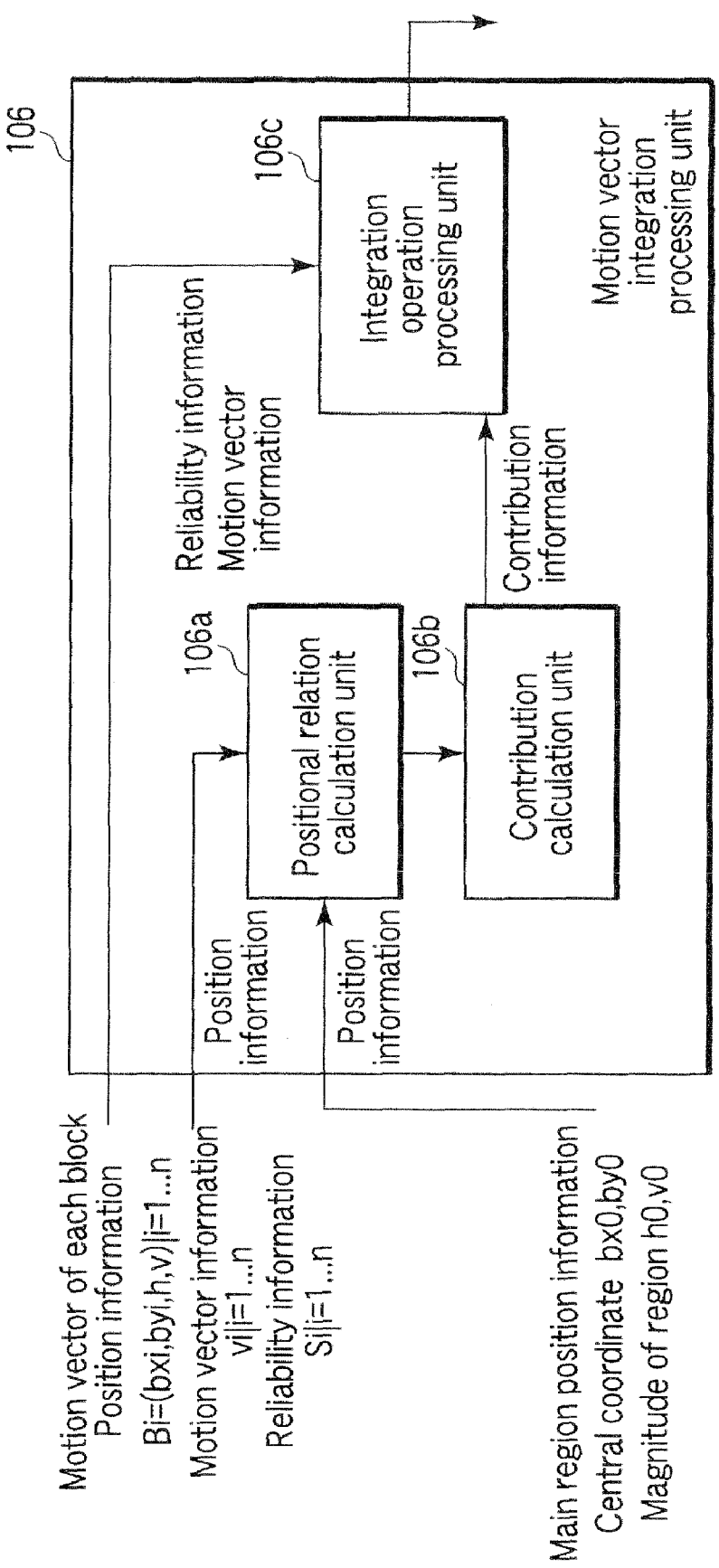
FIG. 2 is a block diagram showing a detailed circuit configuration of a motion vector integration processing unit in FIG. 1 according to the same embodiment.

Hereinafter, one embodiment of a case where the present invention is applied to an image pickup apparatus will be described.

FIG. 1 shows a main circuit configuration of an image pickup apparatus 10 according to the present embodiment. Reference numeral 100 represents a main controller which controls the whole operation of the image pickup apparatus 10. As the main controller 100, a processor such as a DSP (digital signal processor) is employed. In the diagram, the solid thin line represents a control signal, the broken thick line represents data, for example, on a motion vector or reliability, and the solid thick line represents image data.

An image pickup unit 101 includes a lens optical system, which is not shown, and a solid-state image pickup element, such as a CCD (Charge Coupled Device), as main structural elements. The main controller 100 controls the condition and imaging operation of the image pickup unit 101.

A processing number setting unit 110 sets a number of continuous imaging frames of a multiple exposure function. More specifically, the number of frames is set in accordance with a blur reduction mode and a photometry condition.

As described later, an exposure condition control unit 107 determines an exposure parameter in accordance with an imaging mode and a focal distance of the lens optical system constituting the image pickup unit 101, and sets the lens optical system of the image pickup unit 101, an exposure time of an image pickup element, and a condition, for example, of a gain for an image pickup element output as a film speed adjustment.

Image data input from the image pickup unit 101 at the time of imaging is temporarily stored in a frame memory 102, and a motion vector between a reference frame and a target frame is calculated by circuitry of an image processing system including a motion vector measurement region setting unit 103 and a motion vector calculation unit 104.

More specifically, the motion vector measurement region setting unit 103 sets a predetermined region by dividing a reference frame stored in the frame memory 102 into block regions provided, for example, in such a manner as to form a lattice pattern in an image as mentioned later.

The motion vector calculation unit 104 calculates a position of a block in a target frame having high correlation with the block in the reference frame by obtaining the above-mentioned squared difference SSD and absolute value of a difference SAD or performing a correlation operation, such as a normalized cross correlation NCC by use of image data on the target frame and on the reference frame stored in the frame memory 102 and data set at the motion vector measurement region setting unit 103.

A motion vector reliability calculation unit 105 performs reliability determination of a motion vector based on the calculation result of the motion vector calculation unit 104. The details of this step will be described later.

A main region setting unit 108 sets information on a main subject in an image, and sends out the setting result to a motion vector integration processing unit 106.

The motion vector integration unit 106 integrates motion vector data in accordance with the reliability obtained by the motion vector reliability calculation unit 105 and the information on the main subject received from the main region setting unit 108, calculates a representative value of a motion vector between frames, and outputs the representative value to a frame accumulation unit 109.

FIG. 2 shows a detailed configuration of the motion vector integration processing unit 106. As shown in the diagram, the motion vector integration processing unit 106 includes a positional relation calculation unit 106a, a contribution calculation unit 106b, and an integration operation processing unit 106c.

The positional relation calculation unit 106a calculates a positional relation by use of position information on the main region and position information on the motion vector measurement region, and outputs the calculation result to the contribution calculation unit 106b. The contribution calculation unit 106b calculates a contribution of each motion vector measurement block by use of input information on the positional relation, and outputs the calculation result to the integration operation processing unit 106c. The integration operation processing unit 106c calculates a representative value of a motion vector between frames on the basis of the motion vector of each block and the contribution of each block received from the contribution calculation unit 106b, and outputs the representative value to the frame accumulation unit 109 at the next stage.

The frame accumulation unit 109 performs a frame accumulation on image data in the target frame and the reference frame obtained from the frame memory 102 by use of correction vector data obtained from the motion vector integration processing unit 106.

The operation of the circuit having the above-mentioned configuration will be described below.

The reliability of vector data is evaluated as follows by use of a sum of squared differences between pixel values included in two blocks before and after movement of a subject:

$$SSD(i, j) = \sum_{p \in li, q \in lj} (Lp - Lq)^2 \quad (5)$$

-continued $$li = \begin{cases} x \in \left(bxi - \frac{1}{2}h,\ bxi + \frac{1}{2}h\right) \\ y \in \left(byi - \frac{1}{2}v,\ byi + \frac{1}{2}v\right), \end{cases}$$

$$lj = \begin{cases} x \in \left(bxi + bxj - \frac{1}{2}h,\ bxi + bxj + \frac{1}{2}h\right) \\ y \in \left(byi + byj - \frac{1}{2}v,\ byi + byj + \frac{1}{2}v\right), \end{cases}$$

where bxi and byi are barycentric coordinates of a matching block set at the motion vector measurement region setting unit 103; h and v are a horizontal magnitude and a vertical magnitude of the matching block; the number of each coordinate and each magnitude corresponds to the number of blocks; and bxj and byj are barycentric coordinates of a target block.

The reliability of the i-th block is evaluated based on the difference between the minimum value and mean value of SSD (I, j), and is associated to the i-th block. The reliability based on SSD is associated with each block in accordance with the following three criteria based on the configuration feature of a region:

(1) in the case of an image region of a sharp edge configuration, the reliability of a motion vector is high, and as a result, the error of a point taking the minimum value of SSD is small. In a histogram of SSD, small difference values are concentrated in the vicinity of the point indicating the minimum value of SSD. Therefore, the difference between the minimum value and mean value of SSD is increased.

(2) in the case of a texture or a flat image region, the histogram of difference values is leveled off as a whole, and as a result, the difference between the minimum value and the mean value is small.

(3) in the case of a repetitive configuration, the point taking the minimum difference value is close to the point taking the maximum difference value. Namely, points indicating small differences are dispersed. As a result, the difference between the minimum value and the mean value is small.

Based on the above criteria, a motion vector of high reliability corresponding to the i-th block is selected. The reliability may also be determined based on the amount of edges of each block.

A multiple exposure function of higher reliability can be realized by making registration of continuous images by use of motion vectors obtained in the above manner.

FIG. 3 shows the processing for setting an imaging condition according to the present invention.

First, a focal distance is set (step S301), and a focus is measured by an AF (auto focus) function (step S302). As described later, detection of a main subject from an image, such as face detection, may be performed at the time of focus measurement.

Next, brightness distribution and dispersion information on a field are measured by an AE (auto exposure) function (step S203), and then an imaging mode is set (step S304). The imaging mode sets whether or not to perform blur correction superimposing processing of a plurality of images and the number of images to be used of a case where a plurality of images are used. The setting may be made in advance, and the number of images may be automatically determined based on the result of the photometry and the focal distance (step S305).

Whether or not to perform correction of a blur caused by superimposing may be set by the main controller 100 in response to an instruction by a user, or may be automatically determined by the main controller 100. In the case of automatic determination, whether or not to perform correction of a blur is determined based on the exposure condition and the focal distance.

The EV value (Exposure Value), which is an exposure condition, is determined based on a shutter speed and an aperture value as indicated by the following formula:

$$EV=TV+AV.$$

For example, when the shutter speed is 1/2, TV is 2, and when the shutter speed is 1/60 (1/64) sec, TV is 6. As the TV, an exponentiation number of an exponentiation of 2 approximate to the reciprocal of a shutter speed is given. The AV value represents an exponentiation number of an exponentiation of 2 of a squared aperture value. For example, in the case of aperture value AF=5.6, $$AV=2\log_2 5.6=\log_2 32=5 \text{ is obtained.}$$

The value satisfies the exposure condition when the value equals the sum LV of the film speed of the image pickup element SV and the brightness of the subject BV. The relation between an SV value and an ISO film speed is represented by the following formula:

$$SV=\log_2 0.3 \cdot ISO.$$

For example, when ISO is 400, SV=7 is obtained. The BV value is determined based on the brightness of the subject. To provide a guideline, BV is approximately 10 in fine weather, BV is approximately 3-4 in a well-lit room, and BV is approximately −2 at night. To sum up, the following formula is derived:

$$TV+AV=V=SV-BV \qquad (A1)$$

According to an empirical rule, to prevent a camera shake, the shutter speed must be shorter than a time in seconds of a reciprocal number of a focal distance converted assuming a 35 mm film camera.

For example, when the focal distance is 125 mm, a camera shake amount will be small enough to be tolerated if a shutter is released at a speed higher than 1/125 sec.

Therefore, the condition for preventing a camera shake in a case where the focal distance is 125 mm and a lens whose aperture F value is 4 is used is as follows:

TV=7, which is obtained based on a shutter speed of 1/125 sec, and AV=4 is obtained based on F=4. If an image pickup element equivalent to an ISO film speed of 400 is used, SV=7 is obtained, and the BV value corresponding to the brightness of the subject will be 4 according to formula (A1). Therefore, a subject darker than the subject having that BV value will be of a short exposure.

Therefore, when automatically performing blur correction for the registrating processing of a plurality of images, a camera system is determined in consideration of the imaging parameters (AV, SV and a shutter speed which do not cause a blur and corresponds to a focal distance) and the brightness of the subject BV.

In consideration of the number of images to be used and the focal distance, an aperture value of an aperture stop in a lens optical system constituting the image pickup unit 101 is set (step S306). In a standard setting, the aperture value is set to the maximum aperture value in association with the focal distance.

A shutter speed that does not cause a camera shake is (empirically) determined based on a focal distance, as described above. Therefore, in a case where the film speed of the image pickup element and the brightness of the subject are determined, a shutter speed that satisfies the exposure condition is given when the aperture value (AV value) is determined. Consequently, a focal distance that satisfies the exposure condition and does not cause a camera shake of a case where one image is picked up is determined.

In addition, adjustment to the standard aperture value is made in accordance with the number of images obtained in continuous imaging. As the number of images to be used becomes larger, more time is required to obtain a series of images, and a blur of the subject is more easily caused by the motion of the subject. To avert such a problem, the aperture value is variably controlled to a larger value, and a shutter speed, which will be mentioned later, is set higher.

The above formula (A1) shows an exposure condition 10 in the case where one image is picked up.

When more images are continuously picked up, the SV value is increased (when two images are picked up, the SV value is doubled). In this case, a subject having a lower BV value can satisfy the exposure condition. Alternatively, the AV value may be increased when the BV value remains the same. Accordingly, the control range of the aperture value (possible range) varies in accordance with the number of images.

In contrast to the above, control may be performed in such a manner that the aperture value is increased when the number of images continuously picked up is increased. When registration of images is performed for blur correction while placing importance on the motion of a specific subject, it is considered that the displacement of a background part is increased as the number of images is increased. In such a case, control to set the aperture value to a larger value is performed to reduce overlapping of the background.

Then, a shutter speed in a range that does not cause a camera shake and the corresponding ISO film speed are set in consideration of the exposure and focal distance at that moment (step S307). This is the termination of the processing for setting the imaging condition shown in FIG. 3.

In accordance with the set ISO film speed, a gain for an analog image signal obtained at the image pickup element constituting the image pickup unit 101 is adjusted and set.

In this way, the aperture value is set to a larger aperture value in accordance with multiple exposure, and the aperture value is set to a larger value as the number of images obtained by multiple exposure increases. Accordingly, when blur correction processing is performed by increasing the contribution of the main subject region as described below, the overlapping in the region other than the region including the main subject becomes inconspicuous by making the depth of field shallow and blurring the foreground and background which are regions other than the main subject.

Further, since the shutter speed in a range that does not cause a camera shake and the corresponding ISO film speed are set based on the AE function in consideration of the exposure and focal distance, the camera shake is surely prevented even if the aperture value is set to a larger value.

In addition, according to the method of the above embodiment, the processing load as a whole including the load on the main controller 100 can be reduced since special processing for separating a subject is not required when producing an image in which unnaturalness of the background is reduced while reducing the blur in the main subject region.

The processing for calculating a contribution of the main subject region will be described below.

Figure 4:
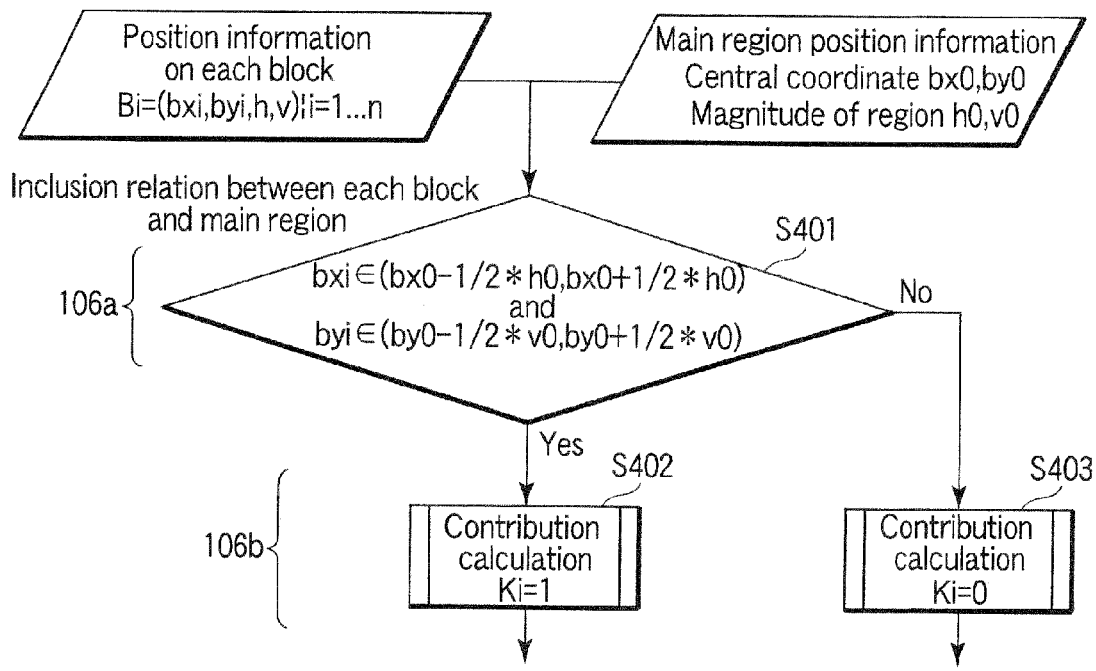
FIG. 4 is a flowchart showing processing for calculating a contribution by use of an inclusion relation between each block and a main subject region according to the same embodiment.

FIG. 4 is a flowchart showing processing for calculating a contribution by use of an inclusion relation between each block and the main subject region.

At the positional relation calculation unit 106a of the motion vector integration processing unit 106, it is determined whether or not the central coordinates bxi and bxj of the target i-th block are included in the main region as follows (step S401):

$$bxi \in \left(bx0 - \frac{1}{2}h0, bx0 + \frac{1}{2}h0\right), \quad (6)$$

$$\text{and, } byi \in \left(by0 - \frac{1}{2}v0, by0 + \frac{1}{2}v0\right)$$

The contribution calculation unit 106b outputs contribution Ki=1 when the determination result is positive (step S402), and outputs Ki=0 when the determination result is negative (step S403).

As a modified embodiment of the contribution calculation, threshold processing may be performed based on the area where the main subject region overlaps the block region in which a motion vector is measured and which is obtained at the motion vector measurement region setting unit 103.

Figure 5:
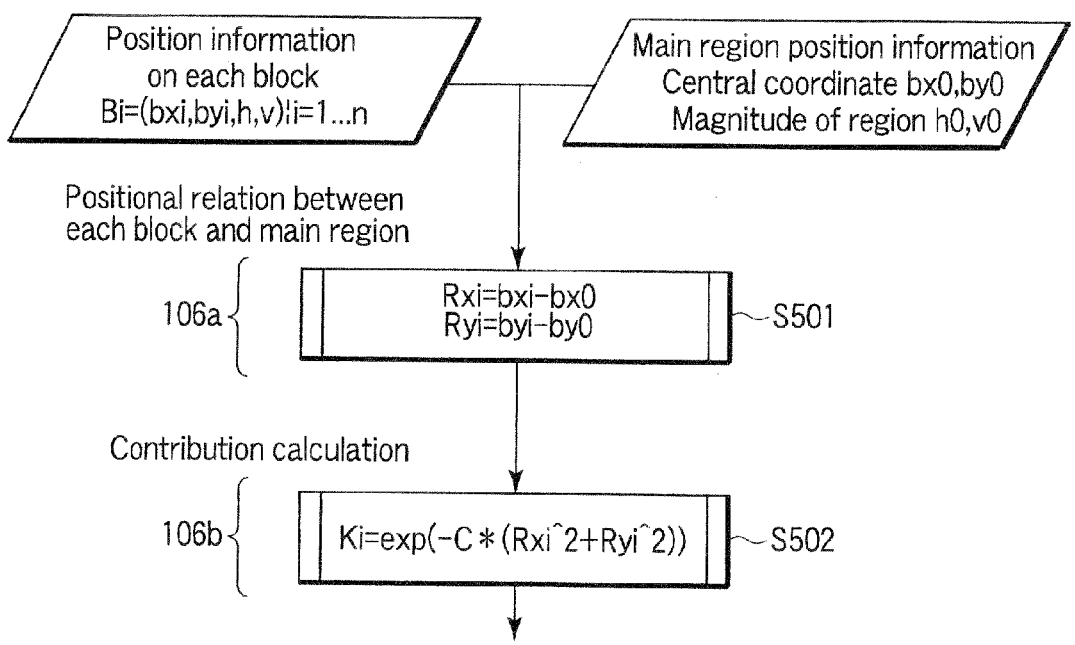
FIG. 5 is a flowchart showing processing for calculating a contribution corresponding to a distance between a main subject region and each motion vector measurement region according to the same embodiment.

FIG. 5 is a flowchart showing processing for calculating a contribution defined in correspondence with a distance between a main subject region and each motion vector measurement region.

At the positional relation calculation unit 106a, a function that derives a smaller contribution as the larger square of the distance between the above regions $$Rxi = bxi - bx0$$

$$Ryi = byi - by0 \quad (7)$$

is used (step S501), and the contribution calculation unit 106b calculates the contribution defined by the following formula (step S502):

$$Ki = \exp(-C(Rxi^2 + Ryi^2)) \quad (8)$$

Figure 6:
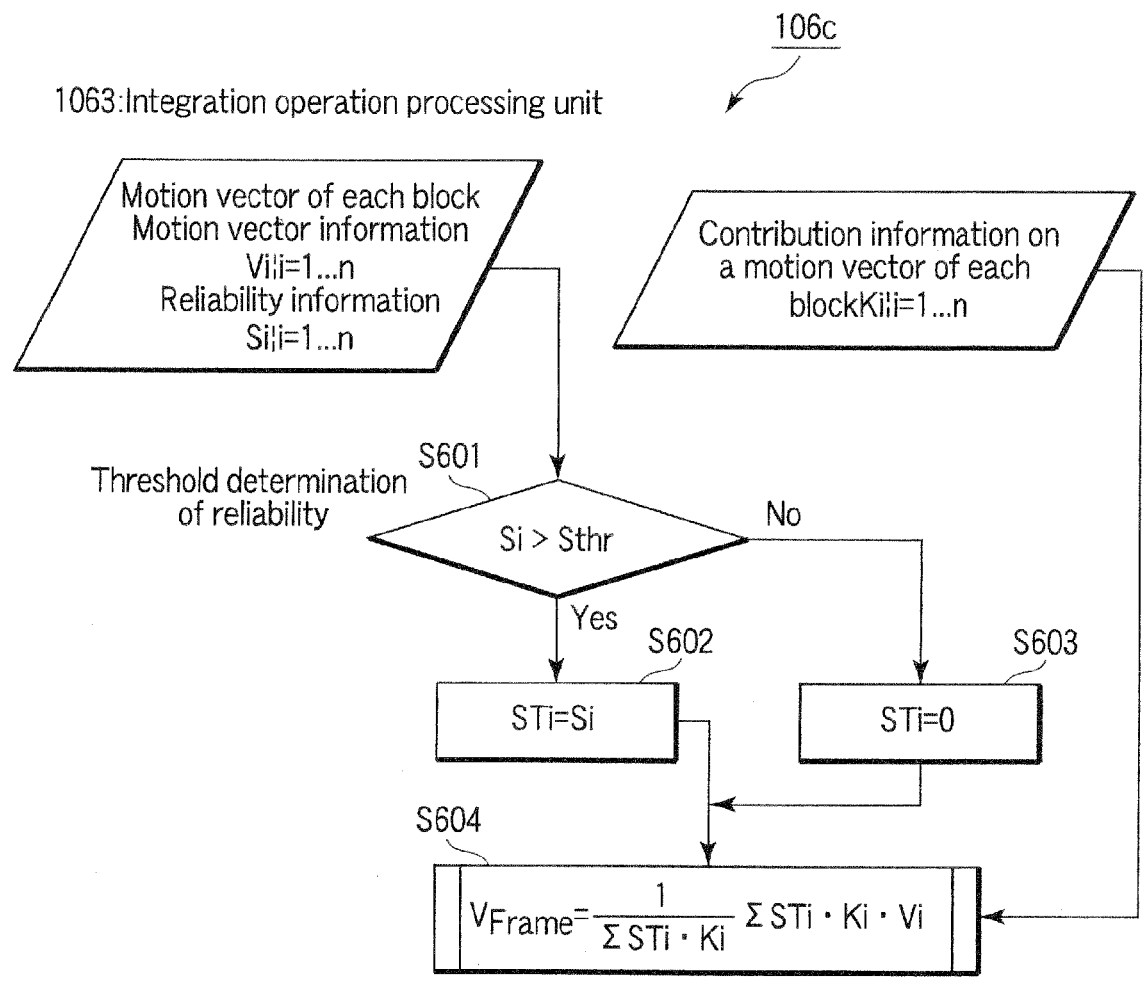
FIG. 6 is a flowchart showing processing at an integration operation processing unit according to the same embodiment.

FIG. 6 is a flowchart showing processing performed at an integration operation processing unit 106c of the motion vector integration processing unit 106. First, it is determined whether or not reliability Si is larger than a threshold (Sthr) (step S601), and the contribution of the block of reliability coefficient Si below the threshold is determined to be 0 (step S603), thereby stabilizing the integration result (step S602).

By use of reliability coefficient Si, measurement result of a motion vector Vi, and contribution Ki, frame correction vector $V_{Frame}$ is obtained based on the following formula (step S604):

$$V_{Frame} = \frac{1}{\sum STi \cdot Ki} \sum STi \cdot Ki \cdot Vi \quad (9)$$

The denominator of the right side of the formula (9) is a normalized coefficient.

As another modified embodiment of the processing at the motion vector integration processing unit 106, a correction vector may be calculated by calculating a motion vector with respect to a region selected in advance by use of information on the main subject region output from the main region setting unit 108 and information on the motion vector measurement region output from the motion vector measurement region setting unit 103, and integrating motion vector data in accordance with the reliability in the region.

In this way, after weighting the motion vector of the region selected in advance, registration of a plurality of images is performed, thereby more surely preventing a camera shake in a case where the position of the main subject in image data is known in advance, such as a case where a user designates a central spot as a focus position.

Next, instead of the configuration shown in FIG. 1, described below is another exemplary configuration detecting a region including a face of a person as a main subject in an image.

Figure 7:
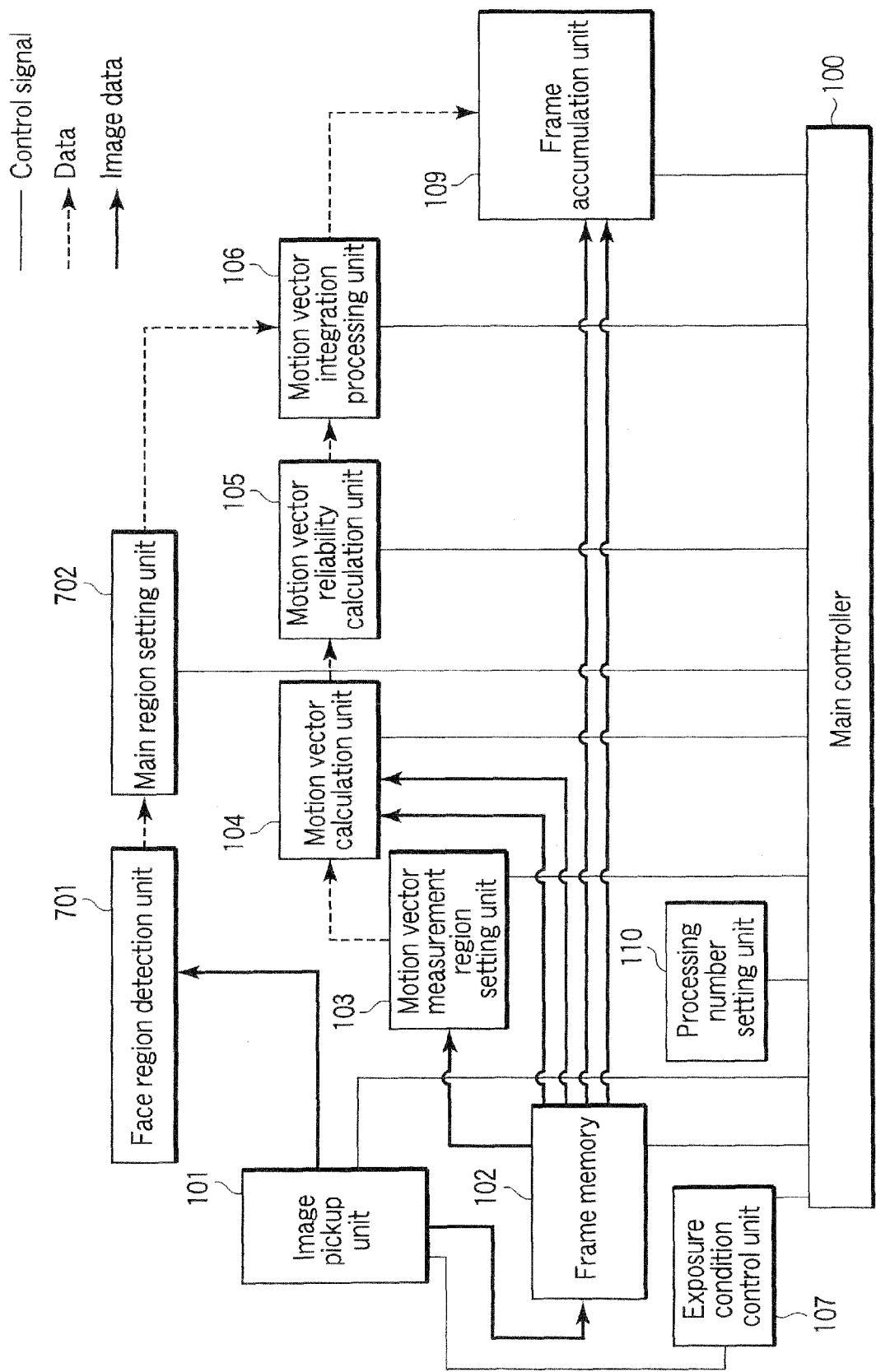
FIG. 7 is a block diagram showing another circuit configuration of the image pickup apparatus according to the same embodiment.

FIG. 7 shows a case where means for detecting a face of a person is used as means for setting a main subject region. The basic configuration is the same as the configuration shown in FIG. 1. Thus, like elements are represented by like reference numerals, and the explanations of these elements will be omitted.

Image data output from the image pickup apparatus 10 is also output to a face region detection unit 701. The face region detection unit 701 is configured to detect the position and magnitude of the region of a face of a person in the input image data, and send the detection result to a main region setting unit 702.

The main region setting unit 702 determines a region including a face of a person, that is a main subject, by use of the detection result received from the face region detection unit 701, and outputs the determination result to the motion vector integration processing unit 106.

Based on the above-mentioned circuit configuration, face detection is performed by the face region detection unit 701 using the algorithm and the applied algorithm described, for example, in "Paul Viola, Michael Jones: Robust Realtime Object Detection Second International Workshop on Statistical and Computational Theories of Vision-Modeling, Learning, Computing and Sampling 2001." The algorithm enables detection of the position and approximate size of a face of a person.

Figure 8:
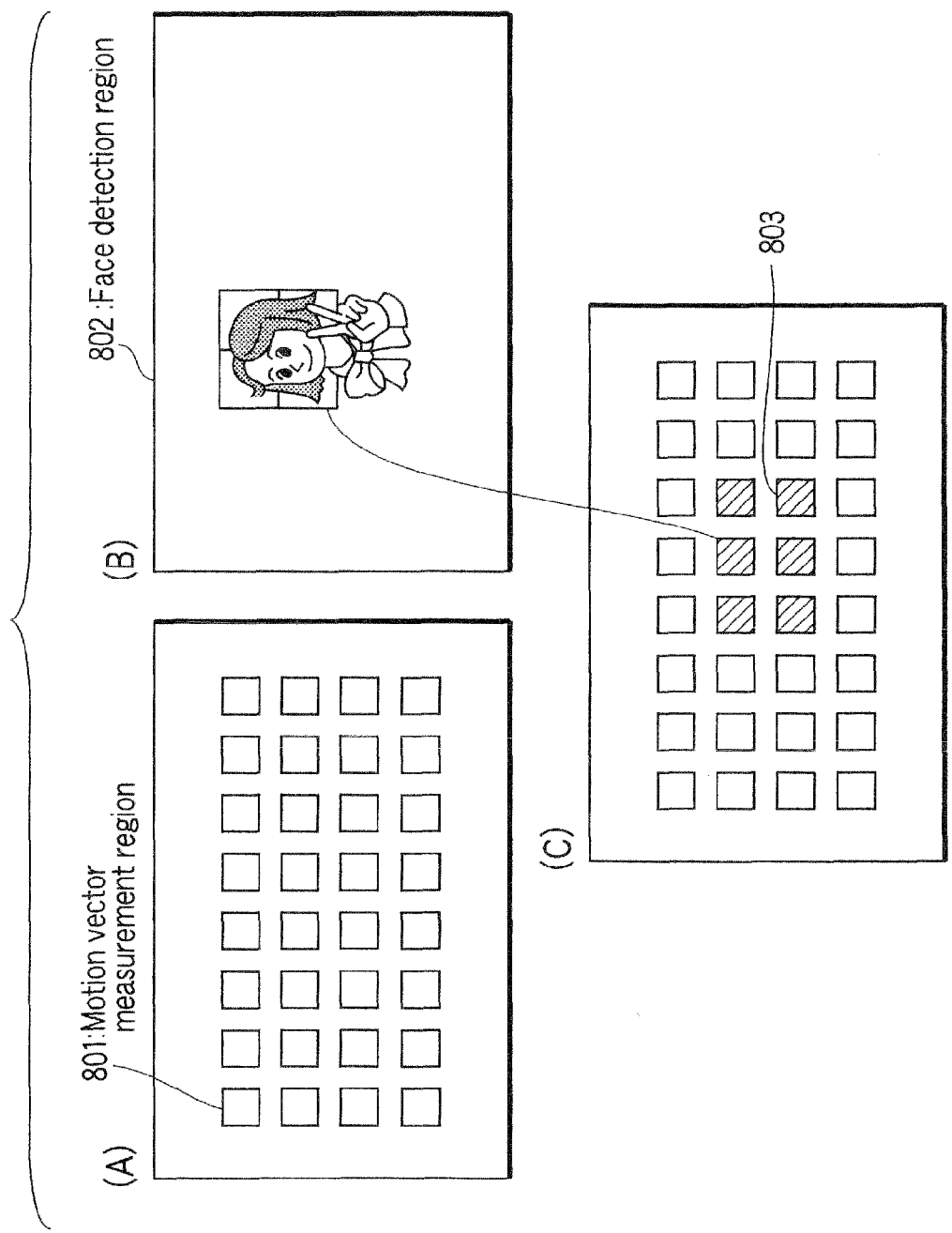
FIG. 8 is a drawing exemplifying a motion vector measurement region and a face detection region in image data according to the same embodiment.

FIG. 8(A) shows a motion vector measurement region 801 set in image data by the motion vector measurement setting unit 103 shown in FIG. 1. FIG. 8(B) shows a detected region 802 detected as a result of face detection at the face region detection unit 701.

The motion vector integration processing unit 106 integrates the measured motion vector information and face detection information, and assigns a high priority to the motion vector data of the region including a face of a person shown in FIG. 10(C), which will be mentioned later.

In this case, calculation of a contribution is performed by the methods shown in FIGS. 4 and 5 and a method performed in accordance with the overlapping area of regions. The motion vector integration processing unit 106 performs the integration operation shown in FIG. 6 in consideration of the reliability of the motion vector and the contribution calculated based on the positional relation between the face region and the motion vector measurement region, thereby deriving a correction vector between frames.

Next, instead of the configuration shown in FIG. 1, described below is another exemplary configuration detecting focal points of a plurality of points in image data including a main subject, and control according to the detection result is performed.

Figure 9:
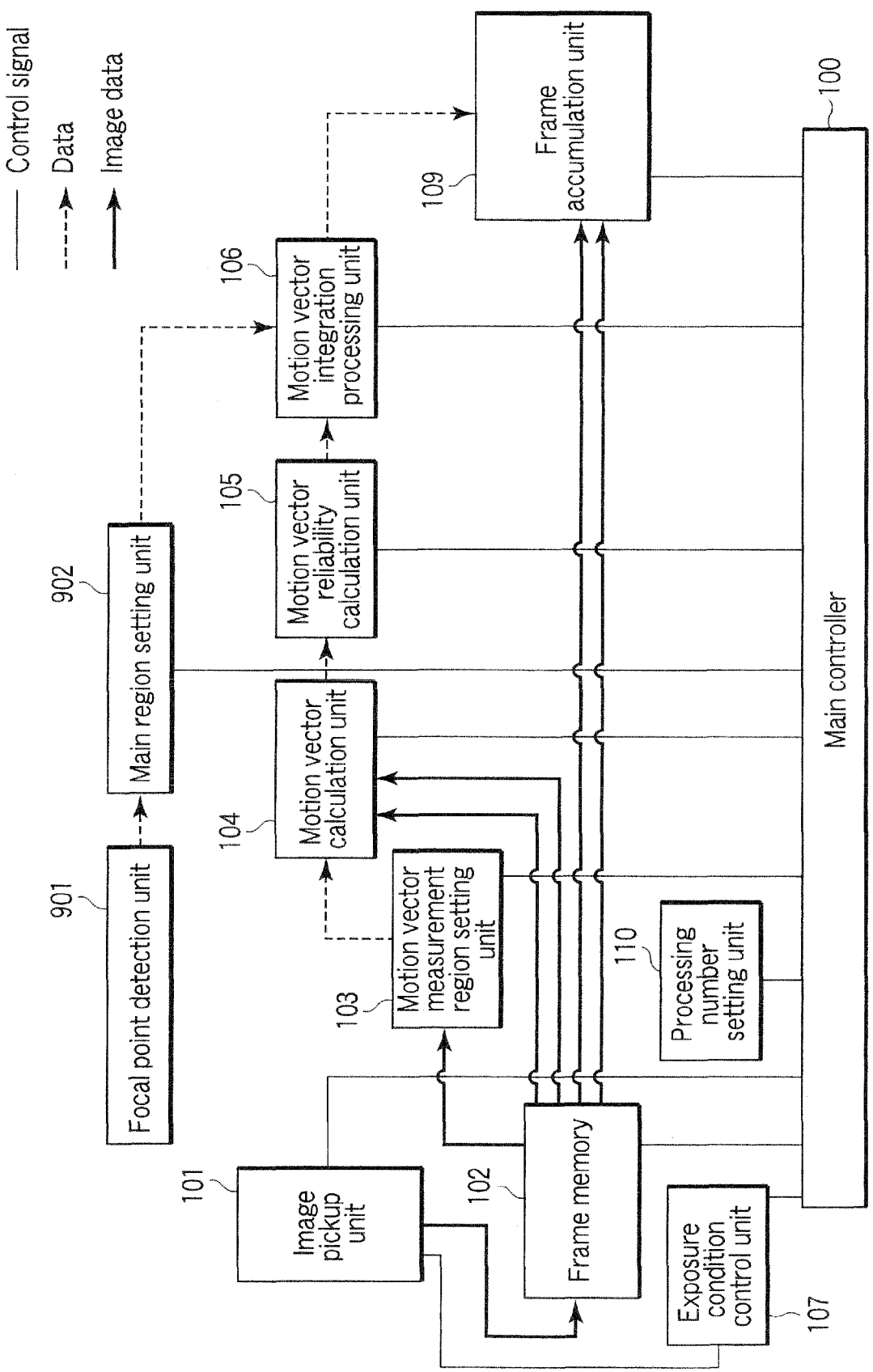
FIG. 9 is a block diagram showing another circuit configuration of the image pickup apparatus according to the same embodiment.

FIG. 9 shows a case of setting a main subject region by detecting focal points of a plurality of regions. The basic configuration is the same as the configuration shown in FIG. 1. Thus, the same elements are represented by like reference numerals, and the explanations of these elements will be omitted.

A focal point detection unit 901 is provided as means for obtaining image information, which is branched off from and different from the image pickup unit 101. The focal point detection unit 901 adopts a phase detection method for detecting a focal point. More specifically, phase detection is performed by performing pupil splitting on the image pickup optical system and evaluating whether or not the focus position with respect to a subject is correct on the basis of the phase difference between two images formed by a separator optical system which is branched off from and different from the lens optical system of the image pickup unit 101.

In an image pickup apparatus, such as a digital camera, it is common to set a focus position on a main subject intended to be picked up by a photographer, and to detect a position of the main subject in accordance with the focus position. The focal point detection unit 901 of the present application detects a focus position of the main subject using the same method.

On the basis of the detection result of the focal point detection unit 901, a main region setting unit 902 sets a main region on a frame memory 102 with reference to focused focal point position information, and outputs the setting result to the motion vector integration processing unit 106.

In the above-mentioned circuit configuration, FIG. 10(A) shows a motion vector measurement region 1001 set by the motion vector measurement region setting unit 103 of FIGS. 1 and 2, and FIG. 10(B) shows points 1002 on which focal point detection is performed. From the points 1002 on which focal point detection is performed, a focused focal point position can be detected by the above-mentioned phase difference detection.

The main region setting unit 902 obtains focused regions 1003 indicated by hatching in FIG. 10(C) by integrating information on the focused focal point position and information on the motion vector measurement position, and outputs them to the frame accumulation unit 109. The motion vector integration processing unit 106 assigns a high priority to the motion vector data of those regions. The contribution is calculated by the method shown in FIG. 4 or 5 or a method performed in accordance with the area where regions are overlapping one another.

The motion vector integration processing unit 106 performs an integration operation shown in FIG. 6 in consideration of the reliability of the motion vector and the positional relation between the focused focal point position and the motion vector measurement region, and calculates a correction vector between frames.

The operation having such a configuration makes it possible to more accurately recognize the region including a main subject in image data, and perform registration of multiple images on the basis of the motion vector in the region.

The method for detection a focal point is not limited to the above-mentioned phase difference detection, and may be a contrast detection method using an output of the image pickup element constituting the image pickup unit 101. In this case, a displacement vector between frames may be obtained, for example, by performing contrast detection on each of a plurality of segment regions (for example, 25 regions of a 5 by 5 matrix) in an image, determining a region showing the highest contrast as a focused region, and increasing the contributions of motion vectors in the vicinity of the focused focal point position like the configuration shown in FIG. 9.

In the above embodiments, a subject region is divided into a plurality of regions and a motion vector is calculated for each region. However, the operation of a motion vector of the present invention is not limited to this configuration, and a motion vector of frames may be obtained by performing the operation of the motion vector only on a predetermined area, such as a center of an image, while increasing the contribution of the motion vector within the main region of the area.

Further, under an imaging environment in which an imaging condition including a subject does not vary with time, pre-imaging is performed prior to main imaging, and the operation time at the time of main imaging can be substantially reduced by calculating a motion vector of frames based on continuous imaging at the image pickup unit 101 at the time of pre-imaging.

When the difference in blur between a subject and a background is large, the overlapping of the background becomes conspicuous unless the aperture value is set to a maximum value. To solve the problem, the present invention may have a configuration in which the difference in motion between the subject and the background is detected by pre-imaging, and control according to the difference, i.e., control of setting the aperture value to a larger value as the difference becomes larger, is performed.

Additional advantages and modifications will readily occur to those skilled in the art. Therefore, the invention in its broader aspects is rot limited to the specific details and representative embodiments shown and described herein. Accordingly, various modifications may be made without departing from the spirit or scope of the general inventive concept as defined by the appended claims and their equivalents.

What is claimed is:

1. An image pickup apparatus, comprising:
an image pickup unit which obtains an image, the image pickup unit including an image pickup element and an image pickup optical system which includes an aperture stop and forms the image on the image pickup element;
a synthesis instruction unit which provides an instruction to form a multiple exposure image by performing registration of a plurality of images and synthesizing the plurality of images into one image;
an aperture value control unit which controls setting of an aperture value of the aperture stop when the synthesis instruction unit provides the instruction to form the multiple exposure image; and
an image processing unit which forms the multiple exposure image by synthesizing, into one image, a plurality of images obtained by the image pickup unit with the aperture value set by the aperture value control unit;
wherein the aperture value control unit variably controls the aperture value of the aperture stop in accordance with a number of images obtained by continuous imaging performed by the image pickup unit to obtain the plurality of images for the multiple exposure image; and
wherein the aperture value control unit sets a standard aperture value of the aperture stop to a maximum aperture value corresponding to a focal distance of the image pickup optical system, and adjusts the standard aperture value in accordance with the number of images obtained by continuous imaging.

2. The image pickup apparatus according to claim 1, wherein the image processing unit performs registration of the images with reference to motion of a specific region in each of the images, and synthesizes the images into the multiple exposure image.

3. The image pickup apparatus according to claim 2, wherein the image processing unit comprises:
a motion vector measurement region setting unit which sets a plurality of specific regions for measurement of motion vectors between images;
a motion vector reliability calculation unit which calculates a reliability of each of the motion vectors;
a motion vector integration processing unit which calculates a correction vector between a plurality of images by integrating the motion vectors corresponding to the plurality of specific regions in accordance with the calculated reliability; and a main region setting unit which sets a main specific region for at least one image among the plurality of images.

4. The image pickup apparatus according to claim 1, wherein the continuous imaging is performed prior to main imaging, and the aperture value control unit variably controls the aperture value of the aperture stop at a time of the main imaging based on a motion vector measured between a plurality of images.

5. The image pickup apparatus according to claim 1, wherein the aperture value control unit detects focal points of a plurality of positions in a subject image picked up by the image pickup unit, and variably controls the aperture value of the aperture stop in accordance with a plurality of focal point detection results.

6. The image pickup apparatus according to claim 1, further comprising an exposure condition setting unit for setting an exposure time of the image pickup element and an amplification rate of an image signal obtained by the image pickup element in accordance with the setting of the aperture value by the aperture value control unit.

7. A non-transitory computer readable recording medium storing a computer program for controlling an image pickup apparatus comprising an image pickup unit for obtaining an image, the image pickup unit including an image pickup element and an image pickup optical system which includes an aperture stop and forms the image on the image pickup element, the computer program being executable by the image pickup apparatus to perform processes comprising:

providing an instruction to form a multiple exposure image by performing registration of a plurality of images and synthesizing the plurality of images into one image;

controlling setting of an aperture value of the aperture stop when the instruction to form the multiple exposure image is provided; and forming the multiple exposure image by synthesizing, into one image, a plurality of images obtained by the image pickup unit with the set aperture value;

wherein the aperture value of the aperture stop is variably controlled in accordance with a number of images obtained by continuous imaging performed by the image pickup unit to obtain the plurality of images for the multiple exposure image; and wherein the aperture value control unit sets a standard aperture value of the aperture stop to a maximum aperture value corresponding to a focal distance of the image pickup optical system, and adjusts the standard aperture value in accordance with the number of images obtained by continuous imaging.

8. An image pickup apparatus, comprising:

an image pickup unit which obtains an image, the image pickup unit including an image pickup element and an image pickup optical system which includes an aperture stop and forms the image on the image pickup element;

a synthesis instruction unit which provides an instruction to form a multiple exposure image by performing registration of a plurality of images and synthesizing the plurality of images into one image;

an aperture value control unit which controls setting of an aperture value of the aperture stop when the synthesis instruction unit provides the instruction to form the multiple exposure image; and an image processing unit which forms the multiple exposure image by synthesizing, into one image, a plurality of images obtained by the image pickup unit with the aperture value set by the aperture value control unit;

wherein the image processing unit performs registration of the images with reference to motion of a specific region in each of the images, and synthesizes the images into the multiple exposure image; and wherein the image processing unit comprises:

a motion vector measurement region setting unit which sets a plurality of specific regions for measurement of motion vectors between images;

a motion vector reliability calculation unit which calculates a reliability of each of the motion vectors;

a motion vector integration processing unit which calculates a correction vector between a plurality of images by integrating the motion vectors corresponding to the plurality of specific regions in accordance with the calculated reliability; and a main region setting unit which sets a main specific region for at least one image among the plurality of images.

* * * * *